(12) United States Patent
Inuzuka et al.

(10) Patent No.: US 9,795,923 B2
(45) Date of Patent: Oct. 24, 2017

(54) CARTRIDGE TYPE HOLLOW FIBER MEMBRANE MODULE

(71) Applicant: TORAY INDUSTRIES, INC., Tokyo (JP)

(72) Inventors: Hayato Inuzuka, Otsu (JP); Kohei Fujii, Otsu (JP); Norihiro Takeuchi, Otsu (JP); Atsushi Kobayashi, Otsu (JP); Takashi Mimitsuka, Kamakura (JP)

(73) Assignee: TORAY INDUSTRIES, INC., Tokyo (JP)

( * ) Notice: Subject to any disclaimer, the term of this patent is extended or adjusted under 35 U.S.C. 154(b) by 478 days.

(21) Appl. No.: 14/384,994

(22) PCT Filed: Feb. 14, 2013

(86) PCT No.: PCT/JP2013/053580
§ 371 (c)(1),
(2) Date: Sep. 12, 2014

(87) PCT Pub. No.: WO2013/136903
PCT Pub. Date: Sep. 19, 2013

(65) Prior Publication Data
US 2015/0034546 A1    Feb. 5, 2015

(30) Foreign Application Priority Data

Mar. 15, 2012    (JP) .................. 2012-059280

(51) Int. Cl.
*B01D 63/02*    (2006.01)
*B01D 63/04*    (2006.01)

(52) U.S. Cl.
CPC ............. *B01D 63/02* (2013.01); *B01D 63/04* (2013.01); *B01D 2313/02* (2013.01);
(Continued)

(58) Field of Classification Search
CPC ........ B01D 61/08; B01D 61/10; B01D 61/12; B01D 61/18; B01D 61/20; B01D 61/22;
(Continued)

(56) References Cited

U.S. PATENT DOCUMENTS 8,679,337 B2    3/2014  Ishibashi et al.
2004/0074833 A1*  4/2004  Nakamatsu .......... B01D 63/022
                                                    210/321.81
(Continued)

FOREIGN PATENT DOCUMENTS

JP    63-302907    12/1988
JP    02-119923    5/1990
(Continued)

OTHER PUBLICATIONS

International Search Report for International PCT Application No. PCT/JP2013/053580 mailed Apr. 23, 2013.

*Primary Examiner* — Pranav Patel
(74) *Attorney, Agent, or Firm* — RatnerPrestia

(57) ABSTRACT

A cartridge type hollow fiber membrane module includes: a cartridge type hollow fiber membrane element including a hollow fiber membrane bundle, a distribution cylinder, and an adhesive resin portion; a module case including a module case main body portion which has at least one port corresponding to a supply outlet of filtrate or an undiluted solution on a side surface, and a header which has a port corresponding to a supply outlet of filtrate or an undiluted solution, and accommodating the cartridge type hollow fiber membrane element; a first sealing member disposed to come into contact with the distribution cylinder and the header on an external side of a boundary surface between the supporting portion and the adhesive resin portion; and a second sealing member disposed to come into contact with an outer
(Continued)

circumference portion of the distribution cylinder and the module case main body portion.

10 Claims, 6 Drawing Sheets

(52) U.S. Cl.
CPC ...... *B01D 2313/21* (2013.01); *B01D 2313/44* (2013.01); *B01D 2317/04* (2013.01)

(58) Field of Classification Search
CPC ........ B01D 61/28; B01D 61/30; B01D 61/32; B01D 63/02; B01D 63/021; B01D 63/022; B01D 63/04; B01D 69/08; B01D 2201/0407; B01D 2201/291; B01D 2201/302; B01D 2201/313; B01D 2201/316; B01D 2201/44; B01D 2313/025; B01D 2313/08; B01D 2313/086; B01D 2313/10; B01D 2313/105; B01D 2313/19; B01D 2313/23
See application file for complete search history.

(56) References Cited

U.S. PATENT DOCUMENTS

| 2004/0178136 A1* | 9/2004 | Taniguchi | B01D 63/02 210/321.79 |
|---|---|---|---|
| 2006/0113235 A1* | 6/2006 | Strohm | B01D 63/02 210/232 |
| 2007/0039868 A1* | 2/2007 | Ishibashi | B01D 63/02 210/321.69 |

FOREIGN PATENT DOCUMENTS

| JP | 5-033831 | 5/1993 |
|---|---|---|
| JP | 6-60484 | 8/1994 |
| JP | 08-206464 | 8/1996 |
| JP | 2001-269546 | 10/2001 |
| JP | 2011-92801 A | 5/2011 |
| WO | WO 2009/148088 A1 | 12/2009 |

* cited by examiner

CARTRIDGE TYPE HOLLOW FIBER MEMBRANE MODULE

CROSS REFERENCE TO RELATED APPLICATIONS

This is the U.S. National Phase application of PCT/JP2013/053580, filed Feb. 14, 2013, which claims priority to Japanese Patent Application No. 2012-059280, filed Mar. 15, 2012, the disclosures of each of these applications being incorporated herein by reference in their entireties for all purposes.

FIELD OF THE INVENTION

The present invention relates to a cartridge type hollow fiber membrane module for fluid separation. More particularly, the present invention relates to a thermal-resistant cartridge type hollow fiber membrane module which is favorable to refinement and concentration-separation of pharmaceutical products and food, manufacture of sterile water, and the like.

BACKGROUND OF THE INVENTION

Recently, a microfiltration membrane or an ultrafiltration membrane is not only applied to a water treatment that manufactures industrial water or tap water from river water, wetlands water, groundwater, seawater, life drainage, industrial drainage, but also used in a wide variety of fields such as refinement and concentration-separation of food and pharmaceutical products. Above all, an external pressure type hollow fiber membrane module which performs filtering from an outer side to an inner side of the hollow fiber membrane is characterized in that a filtration membrane area per unit capacity of the module may be significantly greatly obtained, and is characterized by a high detergence using air scrubbing which cleans suspended matter on a hollow fiber membrane surface by vibrating the hollow fiber membrane surface using air supplied from a lower part toward an upper part of the hollow fiber membrane module, reverse running water washing which cleans suspended matter on a hollow fiber membrane surface by supplying filtrate or a cleaning liquid from an inner side toward an outer side of the hollow fiber membrane, and the like.

In addition, a hollow fiber membrane module utilized for food and pharmaceutical products use may be used for a membrane treatment system which treats a biologically active undiluted solution by performing sterilization using a hot liquid, sterilization using saturated water vapor, chemical cleaning using acid or alkali, and the like. To do so, thermal resistance and chemical resistance are required for all members included in the module in addition to the hollow fiber membrane.

Heretofore, from the viewpoint of thermal resistance and chemical resistance, a module case made of stainless steel is used, and a hollow fiber membrane module in which a hollow fiber membrane bundle is fixed by an adhesive resin using a heat-resistant epoxy resin as a main component is preferably used.

In the hollow fiber membrane module, when a heat cycle occurring due to a difference in temperature at the time of membrane filtration operation and at the time of saturated vapor sterilization acts on the module, peeling occurs due to a thermal expansion difference between the stainless steel case and the adhesion epoxy resin, and an undiluted solution which is raw water is mixed with filtrate, which is an issue.

On the other hand, a hollow fiber membrane module disclosed in Patent Literature 1 uses a fit fixation structure in which a concave portion and a convex portion are physically fitted such as a screwed joint as a joint between the stainless steel case and the adhesion epoxy resin, and uses a structure in which two circular sealing members are arranged on an inner circumference side and an outer circumference side of a boundary surface between an adhesive resin and a case on an end surface on an opening side of a hollow fiber membrane, thereby enabling an undiluted solution and filtrate to be separated even when a heat cycle is received.

However, in Patent Literature 1, the stainless steel case and the adhesion epoxy resin are physically fitted to each other. Thus, for example, an undiluted solution may flow into a gap and be deposited in the gap in an external pressure-type filtration, and an occurrence of a contamination due to a vapor sterilization defect is concerned in the gap where the undiluted solution flows and is deposited.

On the other hand, it is not preferable in terms of financial burden and environmental load when peeling occurs between the stainless steel case and the adhesion epoxy resin, and the entire module is discarded, and thus a variety of cartridge type hollow fiber membrane modules are being suggested.

In the cartridge type hollow fiber membrane module disclosed in Patent Literature 2, a circulating water passage is formed by liquid-tightly providing a headband shaped outer panel in an outer circumference of a case that accommodates a cartridge type hollow fiber membrane element, and cross flow filtration may be stably performed by forming a continuous hole allowing the circulating water passage to communicate with the inside.

However, in the configuration, an undiluted solution accumulates between the circulating water passage and the case, and liquid accumulation is formed, which may hinder sterilization using a hot liquid or sterilization using saturated water vapor.

PATENT LITERATURE

Patent Literature 1: Japanese Laid-open Patent Publication No. 63-302907
Patent Literature 2: Japanese Laid-open Patent Publication No. 2001-269546

SUMMARY OF THE INVENTION

The invention has been conceived in view of the above description, and provides an easily exchangeable cartridge type hollow fiber membrane module that may stably perform filtration since an undiluted solution does not permeate filtrate within the module at the time of cross flow filtration operation, and has a heat-resistant structure for a hot liquid and saturated vapor.

To resolve the above mentioned issue and achieve an object, a cartridge type hollow fiber membrane module of the invention includes a cartridge type hollow fiber membrane element including a hollow fiber membrane bundle, a distribution cylinder which is disposed in an outer circumference portion of the hollow fiber membrane bundle, and includes a distribution portion that distributes an undiluted solution by a plurality of continuous holes, a supporting portion that is adhesively fixed to one end of the hollow fiber membrane bundle and supports the hollow fiber membrane bundle, and a brim portion formed in the outer circumference portion, and an adhesive resin portion that adhesively fixes the hollow fiber membrane bundle to the supporting portion, a module case including a module case main body portion which has at least one port corresponding to a supply outlet of filtrate or an undiluted solution on a side surface, and a header which has a port corresponding to a supply outlet of filtrate or an undiluted solution, and accommodating the cartridge type hollow fiber membrane element, a first sealing member disposed to come into contact with the distribution cylinder and the header on an external side of a boundary surface between the supporting portion and the adhesive resin portion, and a second sealing member disposed to come into contact with an outer circumference portion of the distribution cylinder and the module case main body portion.

In addition, in the invention described above, the first sealing member is preferably disposed to come into contact with the header and both the supporting portion and the adhesive resin portion by straddling a boundary surface therebetween.

In addition, in the invention described above, the first sealing member is preferably disposed to come into contact with the adhesive resin and the header on an inner side of a boundary surface between the supporting portion and the adhesive resin portion.

In addition, in the invention described above, a ratio L2/L1 of a shortest distance L2 between an inner circumferential surface of the port and the second sealing member to a width L1 of a gap between an inner circumference of the module case main body portion and an outer circumference of the distribution cylinder is preferably 5.0 or less.

In addition, in the invention described above, a third sealing member is preferably disposed to come into contact with the module case main body portion, the header, and the brim portion.

In addition, in the invention described above, an inner circumferential surface of the supporting portion preferably has a tapered shape or a step.

According to embodiments of the invention, a cross flow filtration operation is stably performed by liquid-tightly bonding the hollow fiber membrane bundle and the supporting portion of the distribution cylinder using an adhesive resin to form a cartridge type, and a portion engaged with the module case is not included in the distribution portion where a continuous hole is formed and thus, liquid accumulation is absent, and a sterilization defect or a vapor sterilization defect due to a hot liquid may be prevented. In addition, in the invention, even when adhesion peeling occurs between the distribution cylinder and the adhesive resin due to an effect of a heat cycle, a chemical solution, and the like in future, only the cartridge type hollow fiber membrane element may be exchanged, and financial burden and environmental load may be reduced.

DETAILED DESCRIPTION OF EMBODIMENTS OF THE INVENTION

Hereinafter, a cartridge type hollow fiber membrane module and a cartridge type hollow fiber membrane element according to an embodiment of the invention will be described with reference to drawings. It should be noted that the invention is not limited to the embodiment.

A filtration type using a hollow fiber membrane is roughly classified into two types which are a total amount filtration scheme that filtrates a total amount of a supplied undiluted solution, and a cross flow filtration scheme that supplies an excessive amount of undiluted solution, the undiluted solution is horizontally poured on a membrane surface of a hollow fiber membrane, and a shear flow is provided to the membrane surface to forcibly remove a suspended matter. A total amount filtration is a scheme that filtrates the entire undiluted solution corresponding to a processing object, and has a demerit in that a hollow fiber membrane is easy to be blocked in a filtration of an undiluted solution including a great amount of suspended substances while an operating cost is low. On the other hand, a cross flow filtration continuously circulates an undiluted solution and provides a shear flow on a membrane surface and thus a power cost during a filtration operation or an equipment cost of a high output pump and the like increases. However, a long time operation may be performed without blocking the hollow fiber membrane if possible. The cartridge type hollow fiber membrane module according to the embodiment of the invention may be used for the total amount filtration scheme, however is more preferably used for the cross flow filtration scheme.

The hollow fiber membrane module is needed to have a configuration in which a primary side and a secondary side are liquid-tightly separated. Herein, an undiluted solution or a concentrated liquid thereof, a chemical cleaning liquid, cleaning water, a hot liquid, saturated water vapor, air, or the like pass through the primary side, and filtrate, a chemical cleaning liquid, cleaning water, a hot liquid, and saturated water vapor pass through the secondary side.

The hollow fiber membrane module according to the embodiment of the invention may be operated in a laid down position in which an axial direction of the module is horizontally arranged, or a slant position, however is preferably used in a perpendicularly upward direction. A top and bottom of the hollow fiber membrane module according to the embodiment of the invention indicates a top and bottom in a state in which the hollow fiber membrane module is positioned upright in a perpendicularly upward direction.

Figure 1:
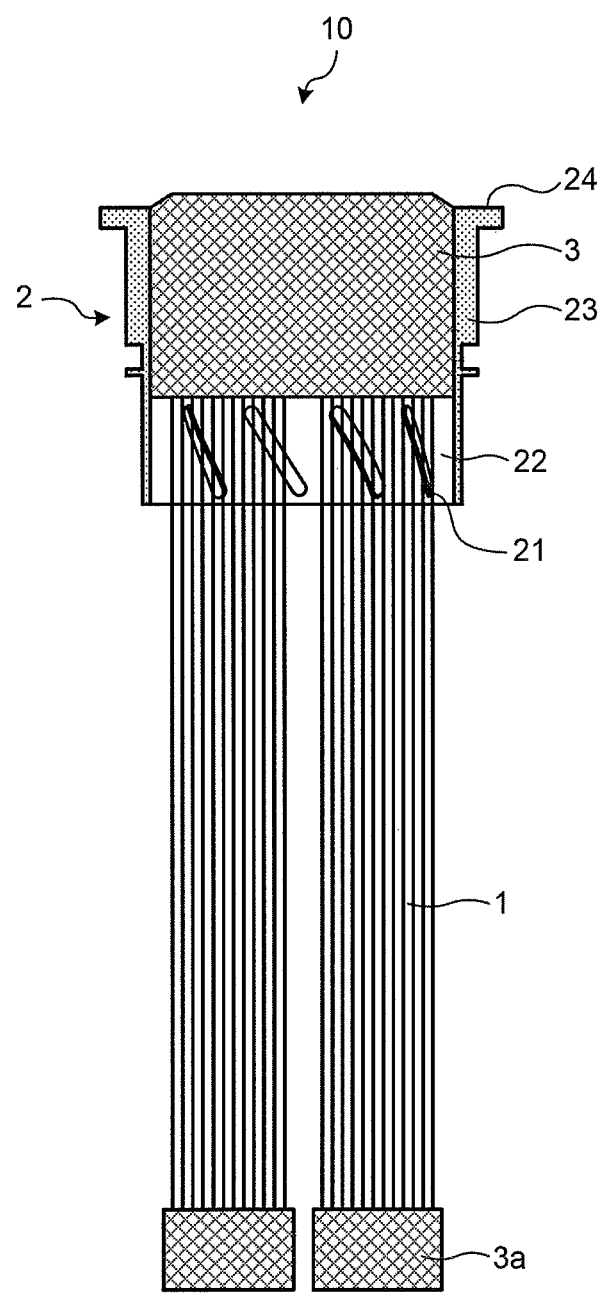
FIG. 1 is a schematic cross-sectional view illustrating a configuration of a cartridge type hollow fiber membrane element according to an embodiment of the invention.
Figure 2:
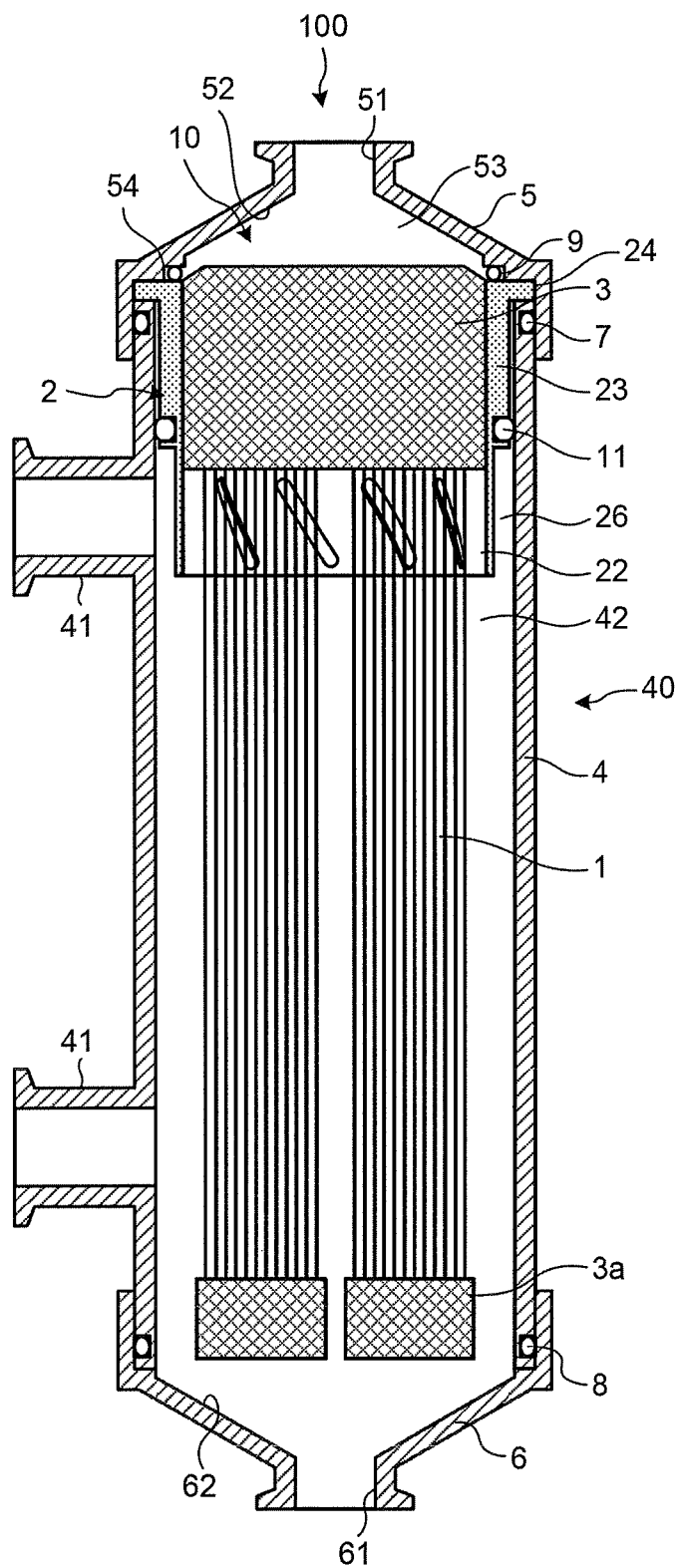
FIG. 2 is a schematic cross-sectional view illustrating a configuration of a cartridge type hollow fiber membrane module that uses the cartridge type hollow fiber membrane element of FIG. 1.
Figure 3:
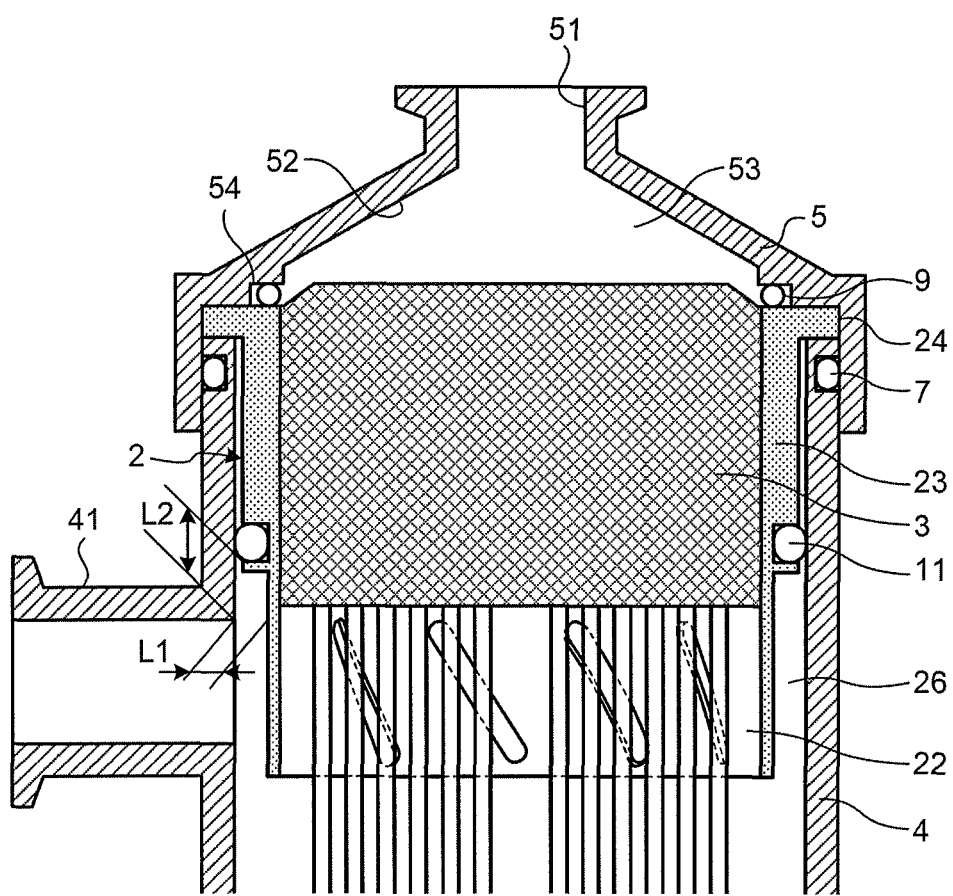
FIG. 3 is an enlarged cross-sectional view of an upper portion of the cartridge type hollow fiber membrane module of FIG. 2.

FIG. 1 is a schematic cross-sectional view illustrating a configuration of a cartridge type hollow fiber membrane element according to an embodiment of the invention. FIG. 2 is a schematic cross-sectional view illustrating a configuration of a cartridge type hollow fiber membrane module that uses the cartridge type hollow fiber membrane element of FIG. 1. FIG. 3 is an enlarged cross-sectional view of an upper portion of the cartridge type hollow fiber membrane module of FIG. 2.

Figure 4:
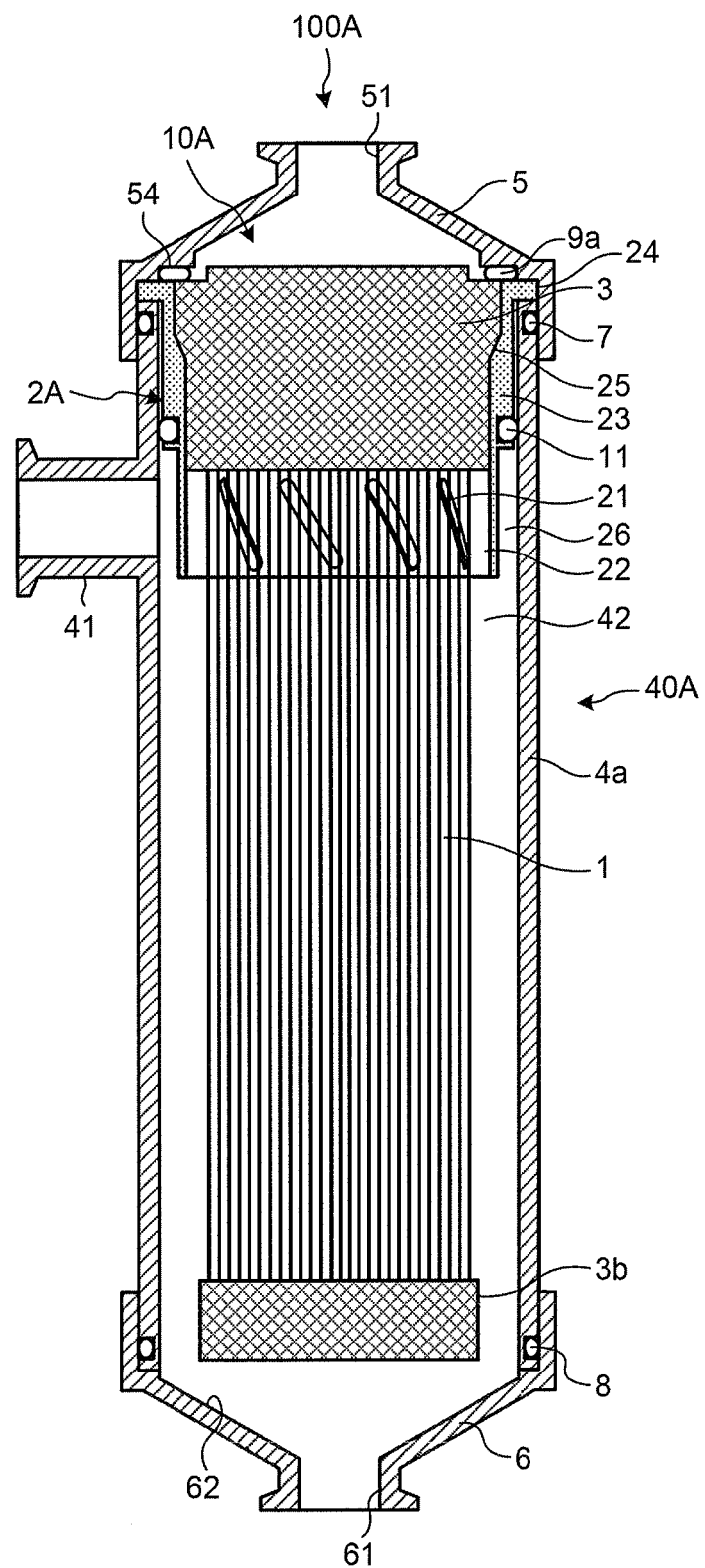
FIG. 4 is a schematic cross-sectional view illustrating a configuration of a cartridge type hollow fiber membrane module according to Modified example 1 of the embodiment of the invention.

As illustrated in FIGS. 1 to 3, a cartridge type hollow fiber membrane element 10 according to the embodiment of the invention includes a hollow fiber membrane bundle 1, and a distribution cylinder 2 which is adhesively fixed to the hollow fiber membrane bundle 1 by an adhesive resin portion 3. In addition, a cartridge type hollow fiber membrane module 100 includes the cartridge type hollow fiber membrane element 10, and a module case 40 which accommodates the cartridge type hollow fiber membrane element 10. The module case 40 includes a cylindrically-shaped module case main body portion 4 including a side surface port 41 corresponding to a supply outlet of filtrate or an undiluted solution, an upper header 5 including a liquid passage port 51 corresponding to a supply outlet of filtrate or an undiluted solution, and a lower header 6 including a liquid passage port 61 corresponding to a supply outlet of filtrate or an undiluted solution. In addition, a connection portion between the upper header 5 and the module case main body portion 4, and a connection portion between the lower header 6 and the module case main body portion 4 are liquid-tightly sealed by a sealing member 7 and a sealing member 8, respectively. In FIG. 2, the module case main body portion 4 includes two side surface ports 41. However, as illustrated in FIG. 4, a module case main body portion 4a may include at least one liquid passage port.

Figure 5:
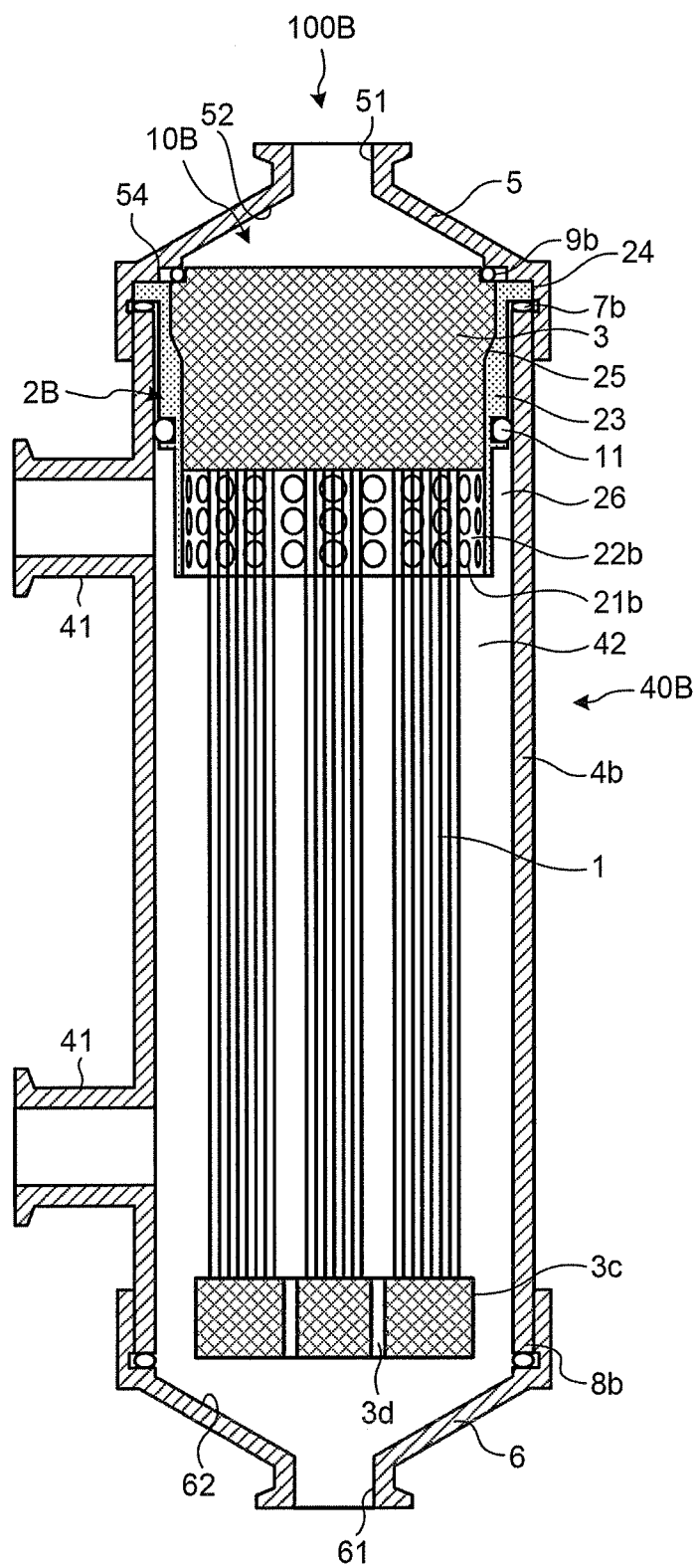
FIG. 5 is a schematic cross-sectional view illustrating a configuration of a cartridge type hollow fiber membrane module according to Modified example 2 of the embodiment of the invention.
Figure 6:
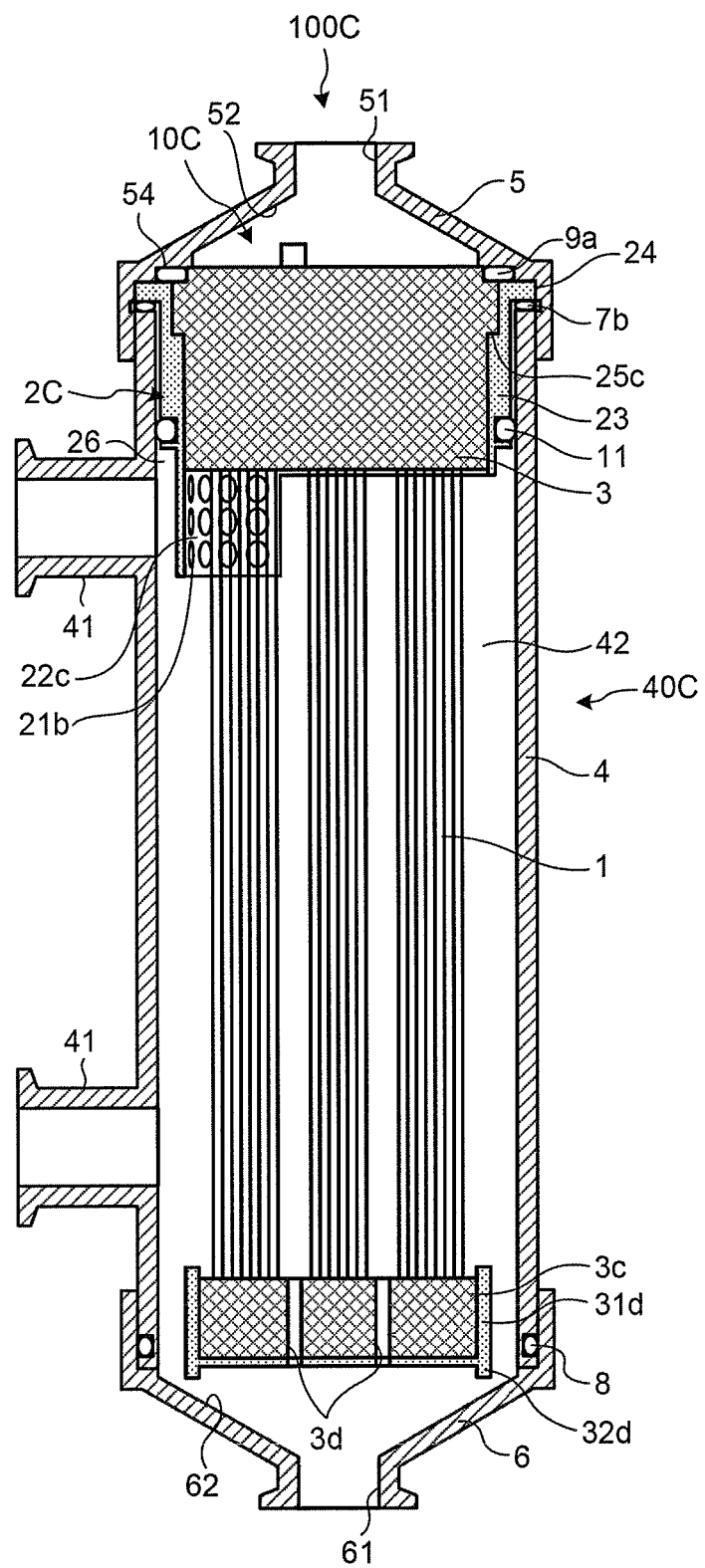
FIG. 6 is a schematic cross-sectional view illustrating a configuration of a cartridge type hollow fiber membrane module according to Modified example 3 of the embodiment of the invention.

The hollow fiber membrane bundle 1 is a bundle of dozens to tens of thousands of hollow fiber membranes cut to the substantially same length. The hollow fiber membrane bundle 1 and the distribution cylinder 2 are liquid-tightly adhesively fixed through the adhesive resin portion 3. A hollow portion of the hollow fiber membrane bundle 1 opens on an end surface of the adhesive resin portion 3. In the other end on an opening side of the hollow fiber membrane bundle 1, a hollow portion is blocked and sealed by an adhesive resin portion 3a. In FIG. 2, a surface of the adhesive resin portion 3a is exposed to a primary side of an undiluted solution and the like. However, the invention is not limited thereto. As illustrated in FIG. 6, a contact with the undiluted solution may be reduced by covering the surface with a concave cap 31d made of the same material as or a different material from that of the distribution cylinder 2. FIG. 5 is a schematic cross-sectional view illustrating a configuration of a cartridge type hollow fiber membrane module according to Modified example 2 of the embodiment of the invention, and FIG. 6 is a schematic cross-sectional view illustrating a configuration of a cartridge type hollow fiber membrane module according to Modified example 3 of the embodiment of the invention. In cartridge type hollow fiber membrane modules 100B and 100C according to Modified examples 2 and 3, an end portion of the hollow fiber membrane bundle 1 is liquid-tightly adhesively fixed by an adhesive resin portion 3c. In the cartridge type hollow fiber membrane module 100C according to Modified example 3, the adhesive resin portion 3c is covered with the concave cap 31d. In addition, it is preferable that a hole 3d be provided in the substantially same direction as a longitudinal direction of the module in the blocked and sealed adhesive resin portion 3c and cap 31d. Further, a skirt portion 32d is formed in an opposite direction of the hollow fiber membrane bundle 1 in a lower portion of the cap 31d.

In addition, the cartridge type hollow fiber membrane module may have a configuration in which the hollow portion of the hollow fiber membrane is not blocked nor sealed, and is folded in letter U, both ends of the hollow fiber membrane bundle 1 is adhered to the distribution cylinder 2 by the adhesive resin portion 3, and the both ends open. In particular, when a ratio of an outer diameter and an inner diameter of the hollow fiber membrane bundle 1 with respect to a turned-back radius of curvature is small, the hollow fiber membrane is difficult to be fractured and is desirable. The cartridge type hollow fiber membrane module 100 according to the embodiment is divided into two by the blocked and sealed adhesive resin portion 3a, however may be adhered and fixed as one by adhesive resin portions 3b and 3c, or may be divided into three or more as illustrated in FIGS. 4 and 5. It is preferable that partially-segmented hollow fiber membrane bundles have the same length, however may have different lengths.

The hollow fiber membrane is not particularly limited when a porous hollow fiber membrane is used. However, an ultrafiltration membrane or a microfiltration membrane made of polyethylene, an ethylene-tetrafluoroethylene copolymer, polychlorotrifluoroethylene, polytetrafluoroethylene, polyvinyl fluoride, a tetrafluoroethylene-hexafluoropropylene copolymer, a tetrafluoroethylene-perfluoroalkylvinylether copolymer, a chlorotrifluoroethylene-ethylene copolymer, polyvinylidene fluoride, polyacrylonitrile, polysulfone, polyethersulfone, and another material may be appropriately used. Further, a filtration material including a sintered body of the polymers may be used. An inner and outer diameter of the hollow fiber membrane is not particularly limited, and various inner and outer diameters and cross section structures may be used. Furthermore, a hollow fiber membrane including a coating layer made of the same or a different material on a surface may be used.

The hollow fiber membrane may be classified into two types of membranes corresponding to an external pressure type and an internal pressure type. An external side of the hollow fiber membrane is a primary side in the external pressure type, and an inner side of the hollow fiber membrane is a primary side in the internal pressure type. The external pressure type has a merit in that a suspended substance is difficult to be deposited between hollow fiber membranes since a passage on the primary side is wide. On the other hand, the internal pressure type has a merit in that a flow rate of a cross flow may be small since a passage on the primary side is narrow. An operation scheme may be selected from the external pressure, type and the internal pressure type based on a state of an undiluted solution, in particular, a concentration of a suspended substance. The cartridge type hollow fiber membrane element 10 and the cartridge type hollow fiber membrane module 100 according to the embodiment of the invention are suitable for an external pressure-type filtration.

The distribution cylinder 2 is disposed in an outer circumference portion of the hollow fiber membrane bundle 1 and near the side surface port 41 on an upper portion of the module case main body portion 4 described below. The distribution cylinder 2 includes a distribution portion 22 which distributes a concentrated undiluted solution by a gap 26 formed between a plurality of continuous holes 21 and the module case main body portion 4 and discharges the concentrated undiluted solution to the side surface port 41, a supporting portion 23 which is adhesively fixed to one end of the hollow fiber membrane bundle 1 and supports the hollow fiber membrane bundle 1, and a brim portion 24 which is fitted and fixed by the module case main body portion 4 and the upper header 5. The adhesive resin portion 3 is formed inside of the supporting portion 23, and the adhesive resin portion 3 adhesively fixes the hollow fiber membrane bundle 1 to the supporting portion 23. When the cartridge type hollow fiber membrane module 100 according to the embodiment of the invention includes the distribution cylinder 2, it is possible to prevent the hollow fiber membrane from being drawn into the side surface port 41 with a flow of the undiluted solution and hindering the passage while resolving a problem that the hollow fiber membrane comes into contact with an edge portion of an entrance of the side surface port 41 and damages the edge portion.

The distribution portion 22 causes a cross flow or cleaning liquid, a hot liquid for sterilization, and vapor for sterilization to flow from a side of a filtration room 42 to a side of the side surface port 41 through the plurality of continuous holes 21, and the gap 26 formed by an external wall of the distribution portion 22 and an internal wall of the module case main body portion 4. It is preferable that an opening area of each of the continuous holes 21 be smaller than an area in which a fluid of the side surface port 41 may pass through, and it is preferable that a total opening area of the continuous holes 21 be greater than or equal to an area in which a fluid of the side surface port 41 may pass through. The continuous holes 21 may be disposed in a longitudinal direction of the module to be above or below the side surface port 41, however it is preferable that the plurality of continuous holes 21 be symmetrically disposed about a horizontal plane that passes through a central axis of the side surface port 41. The continuous holes 21 may be disposed in a circumferential direction of the distribution portion 22 uniformly in the whole circumference of the distribution portion 22, or may be disposed otherwise. The cross flow easily forms an accumulation portion on an opposite face of the side surface port 41 of the module case main body portion 4. For this reason, it is preferable that the continuous holes 21 be arranged so that an opening area thereof increases as being away from the side surface port 41 in a circumferential direction. As a shape of the continuous holes 21, an elliptical shape, circular continuous holes 21b illustrated in FIG. 5, or the like may be employed in addition to a long aperture shape of FIGS. 1 to 3. In addition, a combination thereof may be used. Further, the distribution portion 22 may be formed in a cylindrical shape to surround a circumference of the hollow fiber membrane bundle 1 as FIGS. 1 to 3, and may be formed as a portiere type distribution portion 22c on a side of the side surface port 41 on an upper portion as illustrated in FIG. 6.

An inner circumferential surface of the supporting portion 23 is smoothly formed as FIGS. 1 to 3, and an adhesive property of a boundary surface between the supporting portion 23 and the adhesive resin portion 3 may be enhanced by forming a tapered shape portion 25 along a longitudinal direction of the module as illustrated in FIGS. 4 and 5, and by forming a step portion 25c as illustrated in FIG. 6.

The brim portion 24 protrudes toward an external side in a radial direction on an outer circumference of the distribution cylinder 2. The cartridge type hollow fiber membrane element 10 is fitted and fixed to the module case main body portion 4 and the upper header 5 using a protrusion portion. Since the brim portion 24 comes into contact with the module case main body portion 4 and the upper header 5, it is preferable that the brim portion 24 be installed in a non-wetted portion formed between a first sealing member (sealing member 9) and a second sealing member (sealing member 11). The gap 26 is formed at a side of the filtration room 42 in a lower portion of the second sealing member (sealing member 11), and thus the undiluted solution easily accumulates in the gap 26, and sterilization using hot liquid and sterilization using saturated vapor may be hindered due to the shape of the gap 26. In addition, the brim portion 24 may not be formed as an integrated entity with the distribution cylinder 2. In this case, examples include a scheme of forming a groove on an outer circumference of the distribution cylinder, and attaching a brim member to surround the groove. In addition, a lower edge face of the brim portion 24 may be formed in a perpendicular direction with respect to an axial direction of the distribution cylinder 2. Otherwise, a tapered shape in which a diameter decreases in a downward direction of the distribution cylinder 2 may be used. An upper edge face may be similarly formed to be perpendicular to the axial direction, and may be formed in a tapered shape. In addition, the brim portion 24 may not be formed on the outer circumference 360° of the distribution cylinder 2, and may have a notch. The notch may be used for an alignment of the distribution cylinder 2 and the module case main body portion 4.

When a material of the distribution cylinder 2 is a metal material such as stainless steel and an aluminum alloy, peeling of a boundary surface of an adhesion portion easily occurs at an early stage by a repeatedly performed heat cycle due to a thermal expansion difference between the material and a material of the adhesive resin portion 3 described below. In addition, since a normal vapor sterilization condition is determined to be maintained for 20 minutes in a saturated water vapor of 121° C. by JIS-K-3606, it is preferable that a resin material satisfying a thermal resistance, a water resistance, and a resistance to moist heat with respect to the condition be selected. In this way, it is possible to select engineering plastics such as a polyamide resin, a polycarbonate resin, a polyacetal resin, and a polybutylene phthalate resin, super engineering plastics such as a polyphenylene sulfide resin, a polysulfone resin, a polyethersulfone resin, a polyarylate resin, and a polyetheretherketone resin, composite resins with a reinforcement fiber, and another type of resin material. In particular, a polysulfone resin is suitable.

The adhesive resin portion 3 is formed by hardening an adhesive agent such as an epoxy resin, a urethane resin, a silicone resin, and a polyester resin. In addition, a thermoplastic resin of which softening temperature is higher than a vapor sterilization temperature and the like may be an example. It is preferable that an epoxy resin and a urethane resin be selected in terms of an adhesive property with the distribution cylinder 2, a thermal resistance, a water resistance, a filtration pressure and washing, and sterilization and a pressure resistance to a sterilization pressure.

The module case main body portion 4 includes the side surface port 41 which is an exit and entrance of a fluid. To be suitable used in a cross flow filtration operation, a feed opening and an outlet of an undiluted solution used so that the undiluted solution horizontally flows on a membrane surface are necessary. In the embodiment, the side surface port 41 is a supply outlet of the undiluted solution on the primary side. Similarly, the liquid passage port 61 of the lower header 6 described below is a supply outlet of the undiluted solution. The primary side needs at least two ports. In addition, the secondary side needs at least one liquid passage port which allows passage of filtrate. In the embodiment, the liquid passage port 51 of the upper header 5 described below is an outlet of the filtrate. In this way, it is preferable that the module case 40 include a total of three ports or more.

When a plurality of side surface ports 41 are disposed as in the embodiment, it is preferable that a side surface port 41 be arranged far away from another side surface port 41 on the primary side. In addition, the side surface port 41 may be used to discharge a remaining liquid failing to be filtered, and to supply and discharge vapor for sterilization, a hot liquid for sterilization, air, a cleaning liquid for cleaning a hollow fiber membrane surface. When a plurality of side surface ports 41 are disposed, a plurality of operations may be simultaneously performed and thus operational efficiency is enhanced. Opening portions of the side surface ports 41 may face in the same direction or different directions, respectively.

A material of the module case main body portion 4 may be selected from metal such as stainless steel, and various resin materials such as super engineering plastic or engineering plastic such as FRP, ABS, AES, polyvinyl chloride, polycarbonate, polysulfone. From a viewpoint of a thermal resistance and a chemical resistance, in particular, SUS304 or SUS316 is preferable when stainless steel is selected, and a polysulfone resin is preferable when a resin is selected. A cross-sectional shape may be selected from a circular shape, an elliptical shape, a polygonal shape, and another shape. In particular, a circular shape by which a filtration pressure may be uniformly distributed, and which is superior in pressure resistance is preferable. Unless otherwise specified in this specification, a circular module shape is indicated. The cross-sectional shape may change in a longitudinal direction of the module. In addition, the module case main body portion 4 may have a structure so as to be divided into two or more in a longitudinal direction and a lateral direction. The side surface port 41 may have the same material as or a different material from, a constituent material of the module case main body portion 4. In addition, the module case main body portion 4 and the side surface port 41 may be an integrated entity, and may have a welding connection, a screw connection, and the like. It is preferable that a cross-sectional shape of the side surface port 41 be a circular shape. In addition, an incline shape and a tapered shape in which a diameter changes in an axial direction may be used.

The upper header 5 is disposed above the module case main body portion 4, and includes the liquid passage port 51 which is a supply outlet of a fluid. In addition, the lower header 6 is disposed below the module case main body portion 4, and includes the liquid passage port 61 which is a supply outlet of a fluid. A primary side fluid such as an undiluted solution, a sedimentary material, a cleaning liquid, air, a hot liquid for sterilization, vapor for sterilization passes through the liquid passage port 61 of the lower header 6, and a secondary side fluid such as filtrate, a cleaning liquid, a hot liquid for sterilization, and vapor for sterilization passes through the liquid passage port 51 of the upper header 5. In the embodiment, an undiluted solution is supplied from the liquid passage port 61 of the lower header 6, and filtrate passing through the hollow fiber membrane is discharged from the liquid passage port 51 of the upper header 5. When the module case main body portion 4 includes a plurality of side surface ports 41, a portion of the side surface ports 41 selected from the plurality of side surface ports 41 may be used as a feed opening of an undiluted solution, or an undiluted solution may be supplied using the liquid passage port 61 and a portion of the side surface ports 41 selected from the plurality of side surface ports 41.

Since the module case main body portion 4 and the upper header 5 are liquid-tightly connected to each other, various connection schemes such as a screw connection, a coupler connection, a flange connection, and a ferrule connection may be selected. The module case main body portion 4 and the lower header 6 are similarly connected to each other. It is preferable that tapers 52 and 62 or an incline shape be formed in the upper header 5 and the lower header 6 so that a cross-sectional area decreases from a side where the module case main body portion 4 is connected toward the other side. An angle thereof may be arbitrarily set. However, an accumulation portion of an undiluted solution is formed at 90° from the module in a longitudinal direction, and an entire length of the header increases as the angle decreases and thus a production cost increases. An appropriate value is determined based on the two viewpoints above.

By sandwiching the brim portion 24 of the distribution cylinder 2 between the module case main body portion 4 and the upper header 5, the cartridge type hollow fiber membrane element 10 is fixed to the module case 40. It is preferable that the module case main body portion 4 and the upper header 5 come into contact with each other and be sealed by the sealing member 7. A packing such as an O-ring or a gasket may be used as the sealing member 7. An inside of the module case 40 may be liquid-tightly separated from an outside air by the sealing member 7. Alternatively, as illustrated in FIG. 5, a module case main body portion 4*b*, the upper header 5, and the brim portion 24 of a module case 40B may be sealed by a sealing member 7*b* functioning as a third sealing member. In the upper header 5 of the cartridge type hollow fiber membrane module 100 according to the embodiment, it is preferable that a contact portion with the sealing member 9 described below, a pipe bonding portion of the liquid passage port 51, a bonding portion with the module case main body portion 4, and the taper 52 or an incline portion be smoothly formed.

It is preferable that the module case main body portion 4 and the lower header 6 come into contact with each other and be sealed by the sealing member 8. An inside of the module case 40 may be liquid-tightly separated from an outside air by the sealing member 8. Alternatively, as illustrated in FIG. 5, a module case main body portion 4*b* and the lower header 6 may be sealed by a sealing member 8*b*. In the lower header 6 of the cartridge type hollow fiber membrane module 100 according to the embodiment, it is preferable that a pipe bonding portion of the liquid passage port 61, a bonding portion with the module case main body portion 4, and the taper 62 or an incline portion be smoothly formed. The lower header 6 may be formed as a different entity as in the embodiment, and may be fabricated as an integrated entity with the module case main body portion 4.

A material of the upper header 5 and the lower header 6 may be selected from metal such as stainless steel, and resins such as FRP, ABS, AES, polyvinyl chloride, polycarbonate, or polysulfone. It is preferable that the material be the same as a material of the module case main body portion 4, however the material is not limited thereto.

The sealing member 9 functioning as a first sealing member is disposed to come into contact with a sealing portion 54 of the upper header 5 and a distribution cylinder on an external side of an adhesive interface between the adhesive resin portion 3 and the supporting portion 23 of the cartridge type hollow fiber membrane element 10 accommodated in the module case main body portion 4. From a viewpoint of a sealing property, it is preferable that the sealing portion 54 of the upper header 5 and the distribution cylinder coming into contact with the sealing member 9 be smooth and parallel to each other.

In addition, as illustrated in FIG. 4, a sealing member 9*a* may be disposed to come into contact with the whole circumference of a boundary surface between the supporting portion 23 of the distribution cylinder 2 and the adhesive resin portion 3, and the sealing portion 54 of the upper header 5. FIG. 4 is a schematic cross-sectional view illustrating a configuration of a cartridge type hollow fiber membrane module 100A according to Modified example 1 of the embodiment of the invention. Since the sealing member 9a seals an adhesive interface between the supporting portion 23 and the adhesive resin portion 3, it is preferable that the sealing member 9a have a width capable of coming into contact with the distribution cylinder 2 and the adhesive resin portion 3 along the whole circumference. In Modified example 1, from a viewpoint of a sealing property, it is preferable that the sealing portion 54 of the upper header 5 and an end surface of the adhesive resin portion 3 coming into contact with the sealing member 9a be smooth and parallel to each other.

Further, as illustrated in FIG. 5, a sealing member 9b may be disposed to come into contact with the adhesive resin portion 3 and a sealing portion 54 of the upper header 5 on an inner side of a boundary surface between the supporting portion 23 of the distribution cylinder 2 and the adhesive resin portion 3. FIG. 5 is a schematic cross-sectional view illustrating a configuration of the cartridge type hollow fiber membrane module 100B according to Modified example 2 of the embodiment of the invention. In Modified example 2, from a viewpoint of a sealing property, it is preferable that the sealing portion 54 of the upper header 5 and an end surface of the adhesive resin portion 3 coming into contact with the sealing member 9b be smooth and parallel to each other.

In the embodiment, a space which is liquid-tightly formed by the upper header 5, the supporting portion 23, and the adhesive resin portion 3 through the sealing member 9, 9a, or 9b is filtrate take-out room 53 where filtrate filtered by the hollow fiber membrane bundle 1 flows into, and filtrate flowing out the filtrate take-out room 53 is discharged from the liquid passage port 51. In the embodiment, it is preferable that a width of the sealing portion 54 coming into contact with the sealing member 9 of the upper header 5 be greater than a width of the sealing member 9, 9a, or 9b.

In the cartridge type hollow fiber membrane module 100 according to the embodiment, the secondary side fluid such as filtrate flowing out the filtrate take-out room 53 is separated in the filtrate take-out room 53 within the upper header 5 by the sealing member 9. To ensure a liquid-tightness of the filtrate take-out room 53, the upper header 5 is strongly pressed against the module case main body portion 4, and the sealing member 9 is crushed and sealed. The adhesive interface between the supporting portion 23 and the adhesive resin portion 3 is affected by a downward force due to a dead load of the hollow fiber membrane, an upward force due to a filtration pressure which is a pressure difference between the primary side and the secondary side, and the like. From the above, a shearing force, that is, a force causing peeling acts on the adhesive interface between the adhesive resin portion 3 and the supporting portion 23 fixed to the module case main body portion 4 and having a high rigidity. On the other hand, when the step portion 25c or the tapered shape portion 25 illustrated in FIGS. 4 to 6 is formed on an inner surface of the supporting portion 23 (Modified examples 1 to 3), the sealing member 9a or 9b, and the adhesive resin portion 3 may be put between the sealing portion 54 of the upper header 5 and the supporting portion 23 and thus occurrence of the shearing force may be minimized. Further, it is preferable that a minimum inner diameter of the tapered shape portion 25 and the step portion 25c be smaller than an inner diameter of the sealing member 9a or 9b. One step or two steps or more of the tapered shape portion 25 and the step portion 25c may be formed.

The sealing member 11 functioning as a second sealing member is disposed to come into contact with an outer circumference of the distribution cylinder 2 and an inner circumference of the module case main body portion 4. By the sealing member 11 and the sealing member 8 which seals the module case main body portion 4 and the lower header 6 described above, the primary side fluid such as an undiluted solution is liquid-tightly separated in the filtration room 42 of the module case main body portion 4. The module case 40 is separated from an atmosphere on the outside of the module by the sealing member 7 and the sealing member 8. In addition, the sealing member 11 functions as a backup seal of the sealing member 7 and the sealing member 9.

For example, when the primary side fluid is supplied from the liquid passage port 61 and the side surface port 41 on a lower portion, and is discharged from the side surface port 41 on an upper portion, the primary side fluid is difficult to flow through a region other than a region between the side surface port 41 on the lower portion and the liquid passage port 61 corresponding to a feed opening, and the side surface port 41 on the upper portion corresponding to an outlet. That is, a region which is on the inside of the filtration room 42 where the primary side fluid is separated, and is positioned between the side surface port 41 on the upper portion and the liquid passage port 51 corresponds to a region where a flow of the primary side fluid is relatively slow. In the embodiment, using the gap 26 formed between the module case main body portion 4 and the continuous holes 21 of the distribution cylinder 2 disposed near the side surface port 41 on the upper portion, the primary side fluid is distributed and discharged to the side surface port 41 to suppress an accumulation. However, a region may be formed in which a flow of the primary side fluid is relatively slow among the side surface port 41 on the upper portion, an end surface of the filtration room 42 of the adhesive resin portion 3, and the sealing member 11. In the region, a delay of a flow is remarkable when a ratio L2/L1 of a distance L2 from a top end of an inner circumferential surface of the side surface port 41 on the upper portion to the sealing member 11 to a width L1 of the gap 26 between an inner circumferential surface of the module case main body portion 4 and an outer circumferential surface of the distribution cylinder 2 increases, and it is easier to flow when the ratio L2/L1 decreases. Accordingly, it is preferable that the ratio L2/L1 be 5.0 or less to suppress an accumulation of the primary side fluid. Further, 3.0 or less is preferable, and 1.5 or less is most preferable. In addition, it is preferable that a lower edge face at a side of the filtration room 42 of the adhesive resin portion 3 be positioned at the substantially same height as that of the sealing member 11.

The width L1 of the gap 26 may be calculated by dividing a difference between an inner diameter of the module case main body portion 4 and an outer diameter of the distribution portion 22 by 2. The inner diameter of the module case main body portion 4 may be calculated from a plural phase measurement of an inner diameter near an upper portion of the side surface port 41 on the upper portion, and an average thereof. The outer diameter of the distribution portion 22 may be calculated from a plural phase measurement of an outer diameter of an upper portion of the distribution portion, and an average thereof. An inside micrometer, calipers, a three-dimensional measuring instrument, and the like may be used for the measurement.

The distance L2 from the top end of the inner circumferential surface of the side surface port 41 on the upper portion to the sealing member 11 may be calculated by a difference between a distance from a place coming into contact with the brim portion 24 of the distribution cylinder 2 of the module case main body portion 4 to the top end of the inner circumferential surface of the side surface port 41 on the upper portion, and a distance from a place coming into contact with the module case main body portion 4 of the brim portion 24 to a lower end of the sealing member 11. The respective distances are calculated from a plural phase measurement and an average thereof. Calipers, a three-dimensional measuring instrument, and the like may be used for the measurement.

A material of each of the sealing members 7, 8, 9, and 11 may be selected from a material fabricated by an elastic body such as rubber, elastomer, a resin, and the like. In particular, the material may be selected from nitrile rubber, ethylene propylene rubber, silicone rubber, phlorosilicone rubber, hydrogenated nitrile rubber, fluorine rubber, acrylic rubber, chloroprene rubber, butyl rubber, styrene-butadiene rubber, and urethane rubber depending on a usage environment.

A cross-sectional shape of each of the sealing members 7, 8, 9, and 11 may be selected from an elliptical shape, a polygonal shape, a letter V shape, a letter U shape, a letter ∞ shape, and another shape. Further, as the letter m shape, a shape in which both end portions are thicker than a central portion may be used.

The adhesive resin portion 3 involves a concern that peeling occurs on a boundary surface between the supporting portion 23 and the adhesive resin portion 3 due to a volumetric shrinkage thereof, heat, a heat cycle, chemicals, saturated water vapor, application of an external force such as a pressure. In the case, since the cartridge type hollow fiber membrane module 100 has a cartridge structure, only the cartridge type hollow fiber membrane element 10 may be exchanged, and financial burden and environmental load may be reduced. Further, the primary side fluid may be separated by the module case main body portion 4, the sealing member 8, and the sealing member 11, and the accumulation portion of a cross flow may be reduced by the distribution cylinder 2. In addition, the secondary side fluid may be separated by the hollow fiber membrane, the upper header 5, and the sealing member 9, and peeling force occurring on an adhesive interface between the supporting portion 23 and the adhesive resin portion 3 may be reduced by forming the tapered shape portion 25 or the step portion 25*c*.

EXAMPLES

Hereinafter, the invention will be described in detail using Examples. The invention is not limited thereto.

Reference Example 1

Heat-resistant index bacteria are disposed on the inside of the cartridge type hollow fiber membrane module 100, sterilization is performed by supplying vapor, and an estimation is conducted as to whether a sterilization level is 6D or more. A sterilization level 6D indicates that a probiotic rate of heat-resistant index bacteria is set to $1/10^6$. A test condition is as follows.

Heat-resistant index bacteria: a polyester yarn including *Geobacillus stearothermophilus* ATCC7953 (made by Leben Japan Co., Ltd. 3-6100YT) is used. Hereinafter, it is abbreviated to an index bacteria contained yarn. The index bacteria contained yarn is a yarn obtained by including $10^6$ heat-resistant index bacteria in a polyester yarn of 50.0 mm. In a heat sterilization index of the heat-resistant index bacteria, D121 is 1.5 minutes. D121 is a period of time required for a probiotic rate to be $1/10$ by processing of 121° C. That is, time for 1D processing at 121° C. is 1.5 minutes. "Sterilization processing condition is nD processing" to be described below refers to processing maintained at 121° C. and for n×1.5 minutes. For example, 7D processing refers to processing of 121° C. and 10.5 minutes, and 10D processing refers to processing of 121° C. and 15 minutes.

The index bacteria contained yarn is attached to two places at a side of the filtration room 42 of the sealing member 11 by applying a heat-resistant adhesive to both ends. In a circumferential direction, the two places are a nearest location to the side surface port 41 on the upper portion, and a farthermost location facing the side surface port 41 on the upper portion at 180°.

The sterilization processing condition corresponds to two types of processing of 7D processing and 10D processing. Both of them supply saturated water vapor of 121° C. from the side surface port 41 on the upper portion, and fill the filtration room 42 with saturated water vapor. A steam drain is discharged from a steam trap installed on a lower side of the liquid passage port 61. After a thermometer installed on a lower side of the liquid passage port 61 reaches 121° C., it is maintained for a predetermined period of time (10.5 minutes for 7D processing, and 15 minutes for 10D processing).

To determine a possibility of sterilization, each of index bacteria contained yarns is taken out of the cartridge type hollow fiber membrane module 100 in a germfree atmosphere, and is put and cultured in a test tube in which a sterilized culture medium 10 ml dispensed. A composition of the culture medium is as Table 1 below. Since the culture medium has acidity immediately after preparation, a sodium hydroxide aqueous solution is used to have a pH of 7.0. Cultivation is performed at 40° C. by shaking, and it is determined as to whether heat-resistant index bacteria grow by viewing after a week of cultivation. When a formation of heat-resistant index bacteria is not viewed within the test tube, a growth of the heat-resistant index bacteria is considered absent. When 7D processing is performed by arranging $10^6$ index bacteria, and water vapor sufficiently comes into contact with the index bacteria, a sterilization defect theoretically occurs with a probability of once in ten times, and thus the test is repeatedly conducted ten times for both 7D processing and 10D processing, and a possibility of sterilization is determined. Here, 10D processing is processing that assumes a general condition, and 7D processing is processing that assumes a case where sterilization is difficult when compared to the general condition.

TABLE 1

| Culture Medium for Heat-Resistant Index Bacteria | |
|---|---|
| Component | Amount |
| Polypeptone | 10 g |
| Yeast Extract | 2 g |
| Magnesium Sulfate Heptahydrate | 1 g |
| Water | 1 L |

Reference Example 2

In a configuration of the cartridge type hollow fiber membrane module 100, the module case main body portion 4 is a cylindrical container made of SUS316, and has a length of 1,500 mm, and an inner diameter of 150.0 mm.

One side surface port 41 is installed only on an upper portion such that a diameter is 40.0 mm, and a center is positioned at 100.0 mm from a top end portion of the module case main body portion. The upper header 5 and the lower header 6 are made of SUS316. In the hollow fiber membrane bundle 1, 4,000 hollow fiber membranes made of PVDF and having a length of 1,400 mm are used. A hollow fiber membrane is used by splitting a hollow fiber membrane module "HFU-2020" made by Toray Industries, Inc., and cutting a place not buried in an adhesive resin portion. The distribution cylinder 2 is made of polysulfone and has a length of 130.0 mm, in which the inner supporting portion 23 is 60.0 mm, the distribution portion 22 is 70.0 mm, and an outer diameter of the distribution portion is 140.0 mm. The brim portion has a thickness of 5.0 mm from a top end of the distribution cylinder toward the other side. A two liquid mixed type epoxy resin made by Huntsman Japan Co., Ltd. corresponding to LST868 R-14 and LST868 H-14 is used as the adhesive resin portion 3. The adhesive resin portion has an average thickness of 60 mm, and is liquid-tightly adhered to the supporting portion 23 of the distribution cylinder. An adhesive resin portion on a blocking and sealing side has an outer diameter of 140.0 mm, and an average thickness of 30 mm, puts the hollow fiber membrane bundle 1 together as a bundle. An O-ring made of EPDM is used as the sealing members 7, 8, 9, and 11.

Example 1

The test described in Reference Example 1 is conducted by the cartridge type hollow fiber membrane module described in Reference Example 2. The width L1 of the gap 26 between an inner circumferential surface of the module case main body portion 4 and an outer circumferential surface of the distribution cylinder 2 is 5.0 mm which is obtained by dividing a difference 10.0 mm between an inner diameter 150.0 mm of the module case main body portion 4 and an outer diameter 140.0 mm of the distribution portion 22 of the distribution cylinder 2 by 2. The distance L2 from a top end of an inner circumferential surface of the side surface port 41 on the upper portion to the sealing member 11 is a difference 7.5 mm between a value 80.0 mm obtained by subtracting a radius 20.0 mm of the side surface port from a distance from a place coming into contact with the distribution cylinder brim portion 24 of the module case main body portion 4, corresponding to a top end portion of the module case main body portion in this case, to the top end of the inner circumferential surface of the side surface port 41, which is a distance 100.0 mm from the top end portion of the module case main body portion to a center of the side surface port 41 in this case, and a distance 72.5 mm from a place coming into contact with the module case main body portion 4 of the brim portion 24, corresponding to a lower end of the brim portion 24 in this case, to a lower end of the sealing member 11. L2/L1=7.5/5.0=1.5. The index bacteria contained yarn is adhesively attached to the sealing member 11.

As to a result of determining a possibility of sterilization, a result of performing 7D processing is illustrated in Table 2, and a result of performing 10D processing is illustrated in Table 3.

TABLE 2

| | L1 [mm] | L2 [mm] | L2/L1 | Nearest Side Surface Port Number of Successes/ Number of Tests | Farthermost Side Surface Port Number of Successes/ Number OF Tests |
|---|---|---|---|---|---|
| Example 1 | 5 | 7.5 | 1.5 | 9/10 | 9/10 |
| Example 2 | 5 | 15 | 3.0 | 9/10 | 8/10 |
| Example 3 | 5 | 25 | 5.0 | 8/10 | 7/10 |
| Example 4 | 2.5 | 12.5 | 5.0 | 8/10 | 7/10 |
| Comparative Example 1 | 5 | 35 | 7.0 | 0/10 | 0/10 |
| Comparative Example 2 | 2.5 | 17.5 | 7.0 | 0/10 | 0/10 |

TABLE 3

| | L1 [mm] | L2 [mm] | L2/L1 | Nearest Side Surface Port Number of Successes/ Number of Tests | Farthermost Side Surface Port Number of Successes/ Number of Tests |
|---|---|---|---|---|---|
| Example 1 | 5 | 7.5 | 1.5 | 10/10 | 10/10 |
| Example 2 | 5 | 15 | 3.0 | 10/10 | 10/10 |
| Example 3 | 5 | 25 | 5.0 | 10/10 | 10/10 |
| Example 4 | 2.5 | 12.5 | 5.0 | 10/10 | 10/10 |
| Comparative Example 1 | 5 | 35 | 7.0 | 0/10 | 0/10 |
| Comparative Example 2 | 2.5 | 17.5 | 7.0 | 0/10 | 0/10 |

In Example 1, in 7D processing, a result in which sterilization is not possible once in ten times according to the theory is obtained from Table 2 and Table 3. From the above, saturated water vapor may sufficiently sterilize an index bacteria contained yarn, and the cartridge type hollow fiber membrane module according to Example 1 may be suitable for vapor sterilization.

Example 2

The test described in Reference Example 1 is conducted by the cartridge type hollow fiber membrane module described in Reference Example 2. The width L1 of the gap 26 between an inner circumferential surface of the module case main body portion 4 and an outer circumferential surface of the distribution cylinder 2 is 5.0 mm which is obtained by dividing a difference 10.0 mm between an inner diameter 150.0 mm of the module case main body portion 4 and an outer diameter 140.0 mm of the distribution portion 22 of the distribution cylinder 2 by 2. The distance L2 from a top end of an inner circumferential surface of the side surface port 41 on the upper portion to the sealing member 11 is a difference 15.0 mm between a value 80.0 mm obtained by subtracting a radius 20.0 mm of the side surface port from a distance from a place coming into contact with the distribution cylinder brim portion 24 of the module case main body portion 4, corresponding to a top end portion of the module case main body portion in this case, to the top end of the inner circumferential surface of the side surface port 41, which is a distance 100.0 mm from the top end portion of the module case main body portion to a center of the side surface port 41 in this case, and a distance 65.0 mm from a place coming into contact with the module case main body portion 4 of the brim portion 24, corresponding to a lower end of the brim portion 24 in this case, to a lower end of the sealing member 11. L2/L1=15.0/5.0=3.0. The index bacteria contained yarn is adhesively attached to the sealing member 11.

As to a result of determining a possibility of sterilization, a result of performing 7D processing is illustrated in Table 2, and a result of performing 10D processing is illustrated in Table 3.

Table 3 indicates that sterilization is possible by a general vapor sterilization condition. As such, the cartridge type hollow fiber membrane module according to Example 2 may be suitable to perform vapor sterilization while being inferior to Example 1.

Example 3

The test described in Reference Example 1 is conducted by the cartridge type hollow fiber membrane module described in Reference Example 2. The width L1 of the gap 26 between an inner circumferential surface of the module case main body portion 4 and an outer circumferential surface of the distribution cylinder 2 is 5.0 mm which is obtained by dividing a difference 10.0 mm between an inner diameter 150.0 mm of the module case main body portion 4 and an outer diameter 140.0 mm of the distribution portion 22 of the distribution cylinder 2 by 2. The distance L2 from a top end of an inner circumferential surface of the side surface port 41 on the upper portion to the sealing member 11 is a difference 25.0 mm between a value 80.0 mm obtained by subtracting a radius 20.0 mm of the side surface port from a distance from a place coming into contact with the distribution cylinder brim portion 24 of the module case main body portion 4, corresponding to a top end portion of the module case main body portion in this case, to the top end of the inner circumferential surface of the side surface port 41, which is a distance 100.0 mm from the top end portion of the module case main body portion to a center of the side surface port 41 in this case, and a distance 55.0 mm from a place coming into contact with the module case main body portion 4 of the brim portion 24, corresponding to a lower end of the brim portion 24 in this case, to a lower end of the sealing member 11. L2/L1=25.0/5.0=5.0. The index bacteria contained yarn is adhesively attached to the sealing member 11.

As to a result of determining a possibility of sterilization, a result of performing 7D processing is illustrated in Table 2, and a result of performing 10D processing is illustrated in Table 3.

Table 3 indicates that sterilization is possible by a general vapor sterilization condition. As such, the cartridge type hollow fiber membrane module according to Example 3 may be suitable to perform vapor sterilization while being inferior to Examples 1 and 2.

Example 4

The test described in Reference Example 1 is conducted by the cartridge type hollow fiber membrane module described in Reference Example 2. The width L1 of the gap 26 between an inner circumferential surface of the module case main body portion 4 and an outer circumferential surface of the distribution cylinder 2 is 2.5 mm which is obtained by dividing a difference 5.0 mm between an inner diameter 150.0 mm of the module case main body portion 4 and an outer diameter 145.0 mm of the distribution portion 22 of the distribution cylinder 2 by 2. The distance L2 from a top end of an inner circumferential surface of the side surface port 41 on the upper portion to the sealing member 11 is a difference 12.5 mm between a value 80.0 mm obtained by subtracting a radius 20.0 mm of the side surface port from a distance from a place coming into contact with the distribution cylinder brim portion 24 of the module case main body portion 4, corresponding to a top end portion of the module case main body portion in this case, to the top end of the inner circumferential surface of the side surface port 41, which is a distance 100.0 mm from the top end portion of the module case main body portion to a center of the side surface port 41 in this case, and a distance 67.5 mm from a place coming into contact with the module case main body portion 4 of the brim portion 24, corresponding to a lower end of the brim portion 24 in this case, to a lower end of the sealing member 11. L2/L1=12.5/2.5=5.0. The index bacteria contained yarn is adhesively attached to the sealing member 11.

As to a result of determining a possibility of sterilization, a result of performing 7D processing is illustrated in Table 2, and a result of performing 10D processing is illustrated in Table 3.

Table 3 indicates that sterilization is possible by a general vapor sterilization condition. As such, the cartridge type hollow fiber membrane module according to Example 4 may perform vapor sterilization similarly to Example 3 having the same value of L2/L1 while being inferior to Examples 1 and 2.

Comparative Example 1

The test described in Reference Example 1 is conducted by the cartridge type hollow fiber membrane module described in Reference Example 2. The width L1 of the gap 26 between an inner circumferential surface of the module case main body portion 4 and an outer circumferential surface of the distribution cylinder 2 is 5.0 mm which is obtained by dividing a difference 10.0 mm between an inner diameter 150.0 mm of the module case main body portion 4 and an outer diameter 140.0 mm of the distribution portion 22 of the distribution cylinder 2 by 2. The distance L2 from a top end of an inner circumferential surface of the side surface port 41 on the upper portion to the sealing member 11 is a difference 35.0 mm between a value 80.0 mm obtained by subtracting a radius 20.0 mm of the side surface port from a distance from a place coming into contact with the distribution cylinder brim portion 24 of the module case main body portion 4, corresponding to a top end portion of the module case main body portion in this case, to the top end of the inner circumferential surface of the side surface port 41, which is a distance 100.0 mm from the top end portion of the module case main body portion to a center of the side surface port 41 in this case, and a distance 45.0 mm from a place coming into contact with the module case main body portion 4 of the brim portion 24, corresponding to a lower end of the brim portion 24 in this case, to a lower end of the sealing member 11. L2/L1=35.0/5.0=7.0. The index bacteria contained yarn is adhesively attached to the sealing member 11.

As to a result of determining a possibility of sterilization, a result of performing 7D processing is illustrated in Table 2, and a result of performing 10D processing is illustrated in Table 3.

Tables 2 and 3 indicate that sterilization is not possible by a general vapor sterilization condition. As such, the cartridge type hollow fiber membrane module according to Comparative Example 1 is unsuitable for vapor sterilization.

Comparative Example 2

The test described in Reference Example 1 is conducted by the cartridge type hollow fiber membrane module described in Reference Example 2. The width L1 of the gap 26 between an inner circumferential surface of the module case main body portion 4 and an outer circumferential surface of the distribution cylinder 2 is 2.5 mm which is obtained by dividing a difference 5.0 mm between an inner diameter 150.0 mm of the module case main body portion 4 and an outer diameter 145.0 mm of the distribution portion 22 of the distribution cylinder 2 by 2. The distance L2 from a top end of an inner circumferential surface of the side surface port 41 on the upper portion to the sealing member 11 is a difference 17.5 mm between a value 80.0 mm obtained by subtracting a radius 20.0 mm of the side surface port from a distance from a place coming into contact with the distribution cylinder brim portion 24 of the module case main body portion 4, corresponding to a top end portion of the module case main body portion in this case, to the top end of the inner circumferential surface of the side surface port 41, which is a distance 100.0 mm from the top end portion of the module case main body portion to a center of the side surface port 41 in this case, and a distance 62.5 mm from a place coming into contact with the module case main body portion 4 of the brim portion 24, corresponding to a lower end of the brim portion 24 in this case, to a lower end of the sealing member 11. L2/L1=17.5/2.5=7.0. The index bacteria contained yarn is adhesively attached to the sealing member 11.

As to a result of determining a possibility of sterilization, a result of performing 7D processing is illustrated in Table 2, and a result of performing 10D processing is illustrated in Table 3.

Tables 2 and 3 indicate that sterilization is not possible by a general vapor sterilization condition. In addition, sterilization is not possible with L1/L2=7.0 which is the same as that of Comparative Example 2. From the above, the cartridge type hollow fiber membrane module according to Comparative Example 2 is unsuitable for vapor sterilization.

The cartridge type hollow fiber membrane module 100 includes a region formed by the gap 26 between the module case main body portion 4 and the distribution cylinder 2, and sterilization processing of the region formed above the side surface port 41 which is a feed opening of saturated water vapor may be an issue when the filtration room 42 is sterilized using saturated water vapor. However, vapor sterilization processing may be performed when the ratio L2/L1 of the distance L2 from a top end of an inner circumferential surface of the side surface port 41 to the sealing member 11 to the width L1 of the gap 26 is 5.0 or less. Further, vapor sterilization processing is preferably performed when L2/L1 is 3.0 or less, and vapor sterilization processing is more preferably performed when L2/L1 is 1.5 or less.

REFERENCE SIGNS LIST

1 Hollow fiber membrane bundle
2, 2A, 2B, 2C Distribution cylinder
21, 21b Continuous hole
22, 22b, 22c Distribution portion
23 Supporting portion
24 Brim portion
25 Tapered shape portion
25c Step portion
26 Gap
3 Adhesive resin portion (Hollow portion on opening side)
3a, 3b, 3c Adhesive resin portion (Hollow portion on blocking and sealing side)
3d Hole
31d Cap
32d Skirt portion
4, 4a Module case main body portion
40, 40A, 40C Module case
41 Side surface port
42 Filtration room
5 Upper header
51 Liquid passage port
52 Taper
53 Filtrate take-out room
54 Sealing portion
6 Lower header
61 Liquid passage port
62 Taper
7, 7b, 8, 8b, 9, 9a, 11 Sealing member
10, 10A, 10B, 10C Cartridge type hollow fiber membrane element
100, 100A, 100B, 100C Cartridge type hollow fiber membrane module

The invention claimed is:

1. A cartridge type hollow fiber membrane module comprising:
   a cartridge type hollow fiber membrane element including
      a hollow fiber membrane bundle,
      a distribution cylinder which is disposed in an outer circumference portion of the hollow fiber membrane bundle, wherein the distribution cylinder includes a distribution portion that distributes an undiluted solution by a plurality of continuous holes, a supporting portion that is adhesively fixed to one end of the hollow fiber membrane bundle and supports the hollow fiber membrane bundle, and a brim portion formed in an outer circumference portion of the distribution cylinder, and
      an adhesive resin portion that adhesively fixes the hollow fiber membrane bundle to the supporting portion;
   a module case including a module case main body portion which has at least one side surface port corresponding to a supply outlet of filtrate or the undiluted solution on a side surface, and a header which has a liquid passage port corresponding to the supply outlet of filtration or the undiluted solution, and accommodating the cartridge type hollow fiber membrane element;
   a first sealing member disposed to come into contact with the distribution cylinder and the header on an external side of a boundary surface between the supporting portion and the adhesive resin portion; and
   a second sealing member disposed to come into contact with an outer circumference portion of the distribution cylinder and the module case main body portion,
   wherein the second sealing member is positioned in a range where a ratio L2/L1 of a shortest distance L2 between an inner circumferential surface of the at least one side surface port and the second sealing member to a width L1 of a gap between an inner circumference of the module case main body portion and an outer circumference of the distribution cylinder is 5.0 or less.

2. A cartridge type hollow fiber membrane module comprising:

a cartridge type hollow fiber membrane element including
  a hollow fiber membrane bundle,
  a distribution cylinder which is disposed in an outer circumference portion of the hollow fiber membrane bundle, wherein the distribution cylinder includes a distribution portion that distributes an undiluted solution by a plurality of continuous holes, a supporting portion that is adhesively fixed to one end of the hollow fiber membrane bundle and supports the hollow fiber membrane bundle, and a brim portion formed in an outer circumference portion of the distribution cylinder, and
  an adhesive resin portion that adhesively fixes the hollow fiber membrane bundle to the supporting portion;
a module case including a module case main body portion which has at least one side surface port corresponding to a supply outlet of filtrate or the undiluted solution on a side surface, and a header which has a liquid passage port corresponding to the supply outlet of filtration or the undiluted solution, and accommodating the cartridge type hollow fiber membrane element;
a first sealing member is disposed to come into contact with the header and both the distribution cylinder and the adhesive resin portion by straddling a boundary surface therebetween; and
a second sealing member disposed to come into contact with an outer circumference portion of the distribution cylinder and the module case main body portion,
wherein the second sealing member is positioned in a range where a ratio L2/L1 of a shortest distance L2 between an inner circumferential surface of the at least one side surface port and the second sealing member to a width L1 of a gap between an inner circumference of the module case main body portion and an outer circumference of the distribution cylinder is 5.0 or less.

3. A cartridge type hollow fiber membrane module comprising:
  a cartridge type hollow fiber membrane element including
    a hollow fiber membrane bundle,
    a distribution cylinder which is disposed in an outer circumference portion of the hollow fiber membrane bundle, wherein the distribution cylinder includes a distribution portion that distributes an undiluted solution by a plurality of continuous holes, a supporting portion that is adhesively fixed to one end of the hollow fiber membrane bundle and supports the hollow fiber membrane bundle, and a brim portion formed in an outer circumference portion of the distribution cylinder, and
    an adhesive resin portion that adhesively fixes the hollow fiber membrane bundle to the supporting portion;
  a module case including a module case main body portion which has at least one side surface port corresponding to a supply outlet of filtrate or the undiluted solution on a side surface, and a header which has a liquid passage port corresponding to the supply outlet of filtration or the undiluted solution, and accommodating the cartridge type hollow fiber membrane element;
  a first sealing member is disposed to come into contact with the adhesive resin portion and the header on an inner side of a boundary surface between the supporting portion and the adhesive resin portion; and
  a second sealing member disposed to come into contact with an outer circumference portion of the distribution cylinder and the module case main body portion,
  wherein the second sealing member is positioned in a range where a ratio L2/L1 of a shortest distance L2 between an inner circumferential surface of the at least one side surface port and the second sealing member to a width L1 of a gap between an inner circumference of the module case main body portion and an outer circumference of the distribution cylinder is 5.0 or less.

4. The cartridge type hollow fiber membrane module according to claim 1, wherein a third sealing member is disposed to come into contact with the module case main body portion, the header, and the brim portion.

5. The cartridge type hollow fiber membrane module according to claim 1, wherein an inner circumferential surface of the supporting portion has a tapered shape or a step.

6. The cartridge type hollow fiber membrane module according to claim 2, wherein a third sealing member is disposed to come into contact with the module case main body portion, the header, and the brim portion.

7. The cartridge type hollow fiber membrane module according to claim 2, wherein an inner circumferential surface of the supporting portion has a tapered shape or a step.

8. The cartridge type hollow fiber membrane module according to claim 3, wherein a third sealing member is disposed to come into contact with the module case main body portion, the header, and the brim portion.

9. The cartridge type hollow fiber membrane module according to claim 3, wherein an inner circumferential surface of the supporting portion has a tapered shape or a step.

10. The cartridge type hollow fiber membrane module according to claim 3, wherein the first sealing member is disposed to keep from coming in contact with the adhesive resin portion and the header on an external side of the boundary surface between the supporting portion and the adhesive resin portion.

* * * * *